United States Patent [19]

Hester, Jr. et al.

[11] 3,883,544

[45] May 13, 1975

[54] PREPARATION OF TRIAZOLYBENZOPHENONES

[75] Inventors: Jackson B. Hester, Jr., Galesburg; Martin Gall, Kalamazoo, both of Mich.

[73] Assignee: The Upjohn Company, Kalamazoo, Mich.

[22] Filed: June 21, 1974

[21] Appl. No.: 481,504

Related U.S. Application Data

[60] Division of Ser. No. 351,141, April 16, 1973, Pat. No. 3,842,089, which is a continuation-in-part of Ser. No. 172,918, Aug. 18, 1971, abandoned.

[52] U.S. Cl. .......................... 260/296 R; 260/308 R
[51] Int. Cl. ...................... C07d 55/06; C07d 57/00
[58] Field of Search ..................... 260/308 R, 296 R

[56] References Cited
UNITED STATES PATENTS
3,772,317  11/1973  Hester ............................ 260/308 R OTHER PUBLICATIONS
Derieg et al., Chem. Abstracts, Vol. 74, Abstract No. 125579e (1971). QD1A51.

*Primary Examiner*—Alton D. Rollins
*Attorney, Agent, or Firm*—Hans L. Berneis

[57] ABSTRACT

A process for the production of novel 4-[α-(phenyl)-o-tolyl]-4H-1,2,4-triazoles and 2-(4H-1,2,4-triazol-4-yl)-benzophenones from 2-aminobenzophenones by a multistep process. The novel compounds, of this process, are useful for the production of known highly active tranquilizing phenyl-triazolobenzodiazepines.

9 Claims, No Drawings

PREPARATION OF TRIAZOLYBENZOPHENONES

CROSS-REFERENCE TO RELATED APPLICATION

This is a division of application Ser. No. 351,141, filed Apr. 16, 1973, now U.S. Pat. No. 3,842,089, which was a continuation-in-part of Application Ser. No. 172,918, filed Aug. 18, 1971, and now abandoned.

BRIEF SUMMARY OF THE INVENTION

FIELD OF THE INVENTION

This invention is directed to a process for organic compounds and is more particularly concerned with a process to make 4-[α-(phenyl)-o-tolyl]-4H-1,2,4-triazoles and 2-(4H-1,2,4-triazol-4-yl)benzophenones which are useful intermediates for the production of 6-phenyl triazolobenzodiazepines of high tranquilizing sedative and hypnotic activity.

This new process and the novel intermediates are illustratively represented as follows:

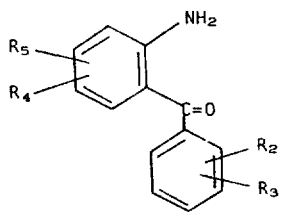

I

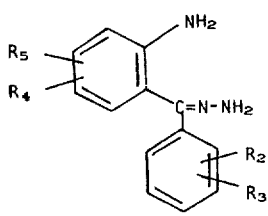

II

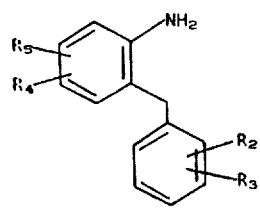

III

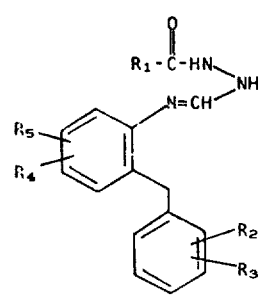

IV

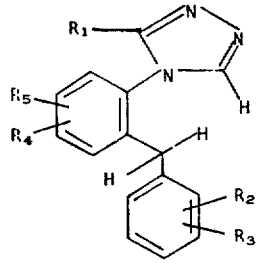

V

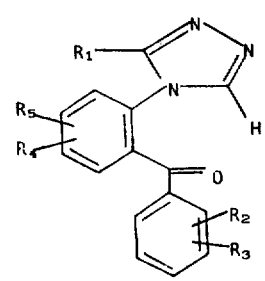

VI wherein $R_1$ is selected from the group consisting of hydrogen, alkyl of 1 to 3 carbon atoms, inclusive, cycloalkyl of 3 to 8 carbon atoms, inclusive, phenyl, and 2-, 3-, or 4-pyridyl, and wherein $R_2$, $R_3$, $R_4$, and $R_5$ are selelcted from the group consisting of hydrogen, halogen, nitro, alkyl, and alkoxy, in which the carbon chain moieties are of 1 to 3 carbon atoms, inclusive.

The compounds of formula VI can then be converted to the compounds of formula IX as shown by the following scheme:

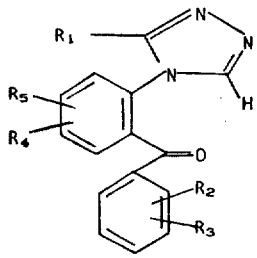

VI

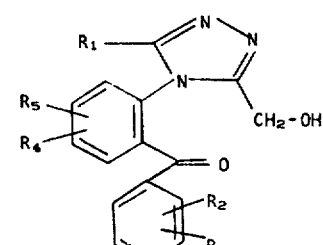

VII

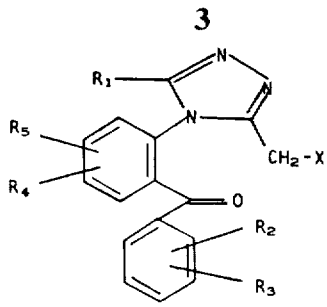

VIII

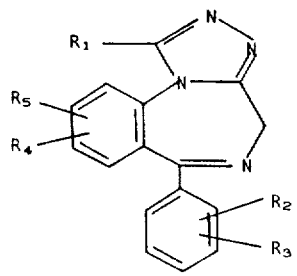

IX wherein $R_1$, $R_2$, $R_3$, $R_4$, and $R_5$ have the same significance as above.

In the more desirable process the parameters $R_1$ are hydrogen, or alkyl of 1 to 3 carbon atoms, inclusive; and $R_2$, $R_3$, $R_4$, and $R_5$ are hydrogen, chlorine, or fluorine. In the most desirable process the substituents are: in the 1-position methyl; and the other substituents are hydrogen and chlorine in both the ortho-position of the α-phenyl group and the 4-position of the tolyl group.

The more preferred intermediates of formula V therefore have the structure

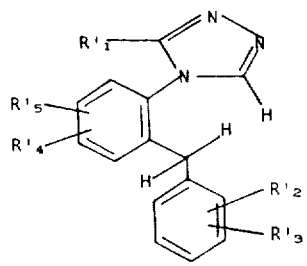

wherein $R'_1$ is hydrogen or methyl; and wherein $R'_2$, $R'_3$, $R'_4$, and $R'_5$ are selected from the group consisting of hydrogen, fluorine, chlorine, and bromine.

The most preferred intermediates of formula V have the structure

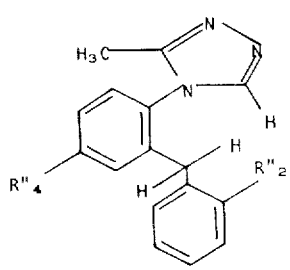

wherein $R_2''$, and $R_4''$ are selected from the group consisting of hydrogen and chlorine.

The process of this invention essentially consists in the steps of:
1. carrying out a Wolff-Kishner reduction on a 2-aminobenzophenone of structure (I). i.e. treating (I) with hydrazine hydrate to obtain the corresponding hydrazone (II); and
2. heating (II), with or without isolation with potassium hydroxide at a temperature between 100°–150° C. in a suitable solvent to obtain the corresponding 2-benzylaniline (III);
3. heating (III) with triethylorthoformate or trimethylorthoformate and then treating the resulting product with an acid hydrazide:

$NH_2—NH—CO—R_1$ wherein $R_1$ is defined as above, to give the corresponding 1-acyl or 1-aroyl-2-(N-(α-phenyl-o-tolyl)formimidoyl]hydrazine (IV);
4. cyclizing IV by heating IV in diglyme with or without pyridine to give the corresponding 4-[α-(phenyl)-o-tolyl]-3-substituted-4H-1,2,4-triazole (V);
5. oxidizing (V) with Jones reagent to obtain the corresponding 2-(3-substituted-4H-1,2,4-triazol-4-yl)benzophenone (VI).

The phenyl triazolo benzodiazepines of formula IX are produced by:
1. treating (VI) with formaldehyde to obtain 2-[3-(hydroxymethyl)-5-substituted-4H-1,2,4-triazol-4-yl]benzophenone (VII);
2. converting the alcohol VII to a halide with a halogenating agent, such as phosphorus tribromide, phosphorus oxychloride, phosphorus triiodide, or thionyl chloride, to obtain the corresponding 2-[3-(halomethyl)-5-substituted-4H-1,2,4-triazol-4-yl]benzophenone (VIII);
3. treating (VIII) with ammonia to give the corresponding 1-substituted-6-phenyl-4H-s-triazolo[4,3-a][1,4]-benzodiazepine.

DESCRIPTION OF THE PREFERRED EMBODIMENT

Lower alkyl groups of 1 to 3 carbon atoms, inclusive, are exemplified by methyl, ethyl, propyl, and isopropyl.

Cycloalkyl groups of 3 to 8 carbon atoms inclusive, comprise cyclopropyl, cyclobutyl, cyclopentyl, cyclohexyl, cycloheptyl, and cyclooctyl.

The carbon chain moiety of alkoxy is of 1 to 3 carbon atoms, inclusive, and can be defined as lower-alkyl of 1 to 3 carbon atoms, inclusive, as above.

The products of formula IX, for which the novel compounds of formula V and compounds of formula VI are intermediates, have sedative, tranquilizing, and hypnotic effects; e.g.

Sedative effects of 8-chloro-1-methyl-6-phenyl-4H-s-triazolo[4,3-a][1,4]benzodiazepine are shown by the following tests in mice:

Chimney test:[Med. Exp. 4, 145 (1961)]: The effective intraperitoneal dosage for 50% of the mice ($ED_{50}$) is 0.09 mg./kg. The test determines the ability of mice to back up and out of a vertical glass cylinder within 30 seconds. At the effective dosage, 50% of the mice failed doing it.

Dish test:Mice in Petri dishes (10 cm. diameter, 5 cm. high, partially embedded in wood shavings), climb out in a very short time, when not treated.

Mice remaining in the dish for more than 3 minutes indicates tranquilization. $ED_{50}$ equals the dose of test compound at which 50% of the mice remain in the dish. The $ED_{50}$ (intraperitoneal administration) in this test was 0.15 mg./kg.; the oral $ED_{50}$ is 0.045 mg./kg.

Pedestal test:The untreated mouse leaves the pedestal in less than a minute to climb back to the floor of the standard mouse box. Tranquilized mice will stay on the pedestal for more than 1 minute. The $ED_{50}$ (intraperitoneal administration) is 0.20 mg./kg.; the $ED_{50}$ (oral administration) is 0.9 mg./kg.

Nicotine antagonism test:Mice in a group of 6 are injected with the test compound (8-chloro-1-methyl-6-phenyl-4H-s-triazolo[4,3-a][1,4]benzodiazepine). Thirty minutes later the mice including control (un-treated) mice are injected with nicotine salicylate (2 mg./kg.). The control mice show overstimulation, i.e., (1) running convulsions followed by (2) tonic extensor fits; followed by (3) death. An intraperitoneal dosage of 0.1 mg./kg. of the test compound protected 50% of the mice against (2) and (3) ($ED_{50}$); the oral $ED_{50}$ is 0.04 mg./kg.

Antagonism to strychnine (as sulfate):The effective dosage of 8-chloro-1-methyl-6-phenyl-4H-s-triazolo[4,3-a][1,4]benzodiazepine is 1 mg./kg. orally in mice. The test consists in orally administering into groups of 6 mice the test compound, 8-chloro-1-methyl-6-phenyl-4H-s-triazolo[4,3-a][1,4]benzodiazepine, and 30 minutes later 3 mg./kg. strychnine sulfate intraperitoneally. The survivors after 4 hours reflect the activity of the compound as a muscle relaxant and antispasmodic. A dosage of 3 mg./kg. of strychnine sulfate is routinely fatal to all the control mice.

The following compounds have (by intraperitoneal injection) $ED_{50}$ as shown in the table below:

| COMPOUND | $ED_{50}$ (in mg./kg.) | | | |
|---|---|---|---|---|
| | Ch | D | P | Ni |
| 2. 8-chloro-1-methyl-6-(2,6-difluorophenyl)-4H-s-triazolo[4,3-a][1,4]benzodiazepine | 0.009 | 0.016 | 0.020 | 0.018 |
| 3. 8-chloro-1-ethyl-6-phenyl-4H-s-triazolo[4,3-a]-[1,4]benzodiazepine | | | | |
| 4. 8-chloro-6-phenyl-4H-s-triazolo[4,3-a][1,1]benzodiazepine | 0.25 | 0.4 | 0.7 | 0.08 |
| 5. 8-chloro-1-methyl-6-(o-chlorophenyl)-4H-s-triazolo[4,3-a][1,4]benzodiazepine | 0.05 | 0.028 | 0.045 | 0.008 |
| 6. 8-chloro-1-methyl-6-(o-fluorophenyl)-4H-s-triazolo[4,3-a][1,4]benzodiazepine | 0.056 | 0.016 | 0.028 | 0.009 |
| 7. 8-chloro-1-cyclopropyl-6-(o-chlorophenyl)-4H-s-triazolo[4,3-a][1,4]benzodiazepine | 0.8 | 0.25 | 0.8 | 0.09 |
| 8. 8-chloro-1-(4-pyridyl)-6-phenyl-4H-s-triazolo[4,3-a]-[1,4]benzodiazepine | 5 | 4.5 | 3.6 | 0.5 |
| 9. 8-chloro-1-(3-pyridyl)-6-phenyl-4H-s-triazolo[4,3-a]-[1,4]benzodiazepine | 5 | 7 | 7 | 2.5 |
| 10. 8-chloro-1-(2-pyridyl)-6-phenyl-4H-s-triazolo[4,3-a]-[1,4]benzodiazepine | 9 | 10 | 15 | 1.4 |
| 11. 8-chloro-1-(4-pyridyl)-6-(o-chlorophenyl)-4H-s-triazolo[4,3-a][1,4]benzodiazepine | 0.23 | 0.32 | 0.32 | 0.06 |

Ch = Chimney test
D = dish test
P = pedestal test
Ni = nicotine antagonism (3) test The pharmaceutical forms contemplated by this invention include pharmaceutical compositions suited for oral, parenteral and rectal use, e.g., tablets, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Oil, e.g., coconut oil, sesame oil, safflower oil, cottonseed oil, peanut oil, or water may be used for preparing solutions or suspensions of the active drug. Sweetening, coloring, and flavoring agents may be added.

These compounds are mainly useful as tranquilizers and sleep inducers in varying dosages depending on weight of the person or animal, and the kind of compound used. The activity data provide a rational answer to the dosages used. Compounds 1 and 5 have been found to be active on 0.1–1 mg. in man for a single dose, which may be taken from 1–3 times daily. Compounds 3, 4, 7, and 11 will require single dosages of 0.05 to 1 mg./kg. in animals. Finally compounds like 8, 9, and 10 need to be given in dosages of 1 to 10 mg./kg. in animals; the extremely active compounds 2 and 6 need to be administered in quantities of only 5–50 γ/kg. in animals to produce sedation and tranquilization. Farm animals, such as cattle, sheep, swine, or pet animals such as dogs and cats and zoo animals during shipping often require tranquilization and these compounds can be utilized for it in the quantities stated above. These compounds at the same time have shown a high degree of safety. The $LD_{50}$ in mice for all compounds above was greater than 100 mg./kg. and in the case of compound 5 was greater than 1000 mg./kg.

The starting materials of this invention are 2-aminobenzophenones described in the literature e.g. in J. Org. chem. 26, 4491 (1961); ibid. 27, 3781 (1962); ibid. 30, 521 (1965); ibid, 32 3798 (1967) and in particular the 2',6'-difluoro-5-chloro-2-aminobenzophenone is described in Belgian Pat. No. 747,493 (1970) and also J. Pharmaceutical Sciences 61, 2508 (1972).

The hydrazide reactants such as formic acid, acetic acid, nicotinic acid, isonicotinic acid, and pyridine-2-carboxylic acid hydrazides are either commercially available or have been described in the literature.

In carrying out the process of this invention a 2-aminobenzophenone (1) is refluxed with excess of hydrazine hydrate in a glycol, e.g. diethylene glycol, propylene glycol, and the like. The excess of hydrazine to 2-aminobenzophenone (1) is from 1.5 to 5 times the required amount. The time of reaction is 1–12 hours. At the termination of the reaction the product is isolated and purified by conventional procedures, such as extraction, crystallization and chromatography to give the corresponding 2-aminobenzophenone hydrazine (II). Alternatively, the crude unisolated hydrazone (II) may be used directly for the next step.

Compound (II) is converted to the corresponding 2-benzylaniline (III) by heating with a strong base e.g. potassium or sodium hydroxide in a high boiling solvent e.g. diethylene glycol, xylenes and the like at 115° C. to reflux temperatures. At the termination of the reaction the product, the corresponding 2-benzylaniline (III), is isolated and purified by conventional means e.g. extraction, chromatography, distillation, recrystallization and the like.

Compound (III) is converted to the corresponding 1-acyl or 1-aroyl-2-[N-(α-phenyl-o-tolyl)formimidoyl]hydrazine in two steps: refluxing the compound (III) for 1–12 hours with triethylorthoformate (or trimethylorthoformate) while distilling off excess ethanol (or methanol) and reacting the resulting product with a selected acid hydrazide, e.g. acethydrazide, propionyl hydrazide, cycloalkylcarbonyl hydrazide e.g. cyclopropylcarbonyl, cyclobutylcarbonyl, cyclohexylcarbonyl hydrazide, isoniazid (isonicotinic acid hydrazide) and the like in an alcohol e.g. ethanol, 1-propanol, 2-propanol or the like. About twice the calculated amount of hydrazide is preferred. The reaction time for this condensation is between 1 to 24 hours. After termination of the reaction, the compound is recovered, isolated and purified by conventional methods such as extraction, chromatography, crystallization, and the like.

Compound (IV) is converted to the corresponding 4-[α-(phenyl)-o-tolyl]-3-substituted-4H-1,2,4-triazole (V) by heating, preferably with pyridine in a high boiling organic solvent e.g. diglyme, mineral oil, or the like. The high temperature, reflux temperature in some instances, is maintained for from 3 to 48 hours. The solvent is then removed by vacuum distillation and the produce (V) is recovered, isolated, and purified by conventional methods such as extraction, chromatography, crystallization, and the like.

Compound (V) is oxidized to the corresponding 2-[3-substituted-4H-1,2,4-triazol-4-yl]benzophenone (VI) with Jones' reagent [chromic acid in sulfuric acid] preferably over a period of 1–10 hours at room temperature and 1–6 hours at reflux. The product (VI) is then recovered, isolated and purified by conventional methods such as extraction, chromatography, crystallization, and the like.

The conversion of compound VI to the final 6-phenyltriazolobenzodiazepine compounds proceeds as follows:

Compound (VI) is converted to the corresponding 2-[3-(hydroxymethyl)-5-substituted-4H-1,2,4-triazol-4-yl]benzophenone (VIII) by heating it with formaldehyde in a solvent. Aqueous formaldehyde at 100°–150° for 3 to 18 hours in a sealed tube system is operative. In the preferred embodiment of this invention excess of paraformaldehyde in a solvent such as toluene, xylenes, isooctane, and the like and heating between 100°–140° C. is used. At this temperature 3 to 18 hours is sufficient for the reaction. The product (VII) is isolated and purified with conventional methods such as chromatography, extraction, recrystallization, or the like.

Compound (VII) is converted to a 2-[3-(halomethyl)-5-substituted-4H-1,2,4-triazol-4-yl]benzophenone (VIII) by treating a solution of compound VII with a halogenating agent such as thionyl chloride or bromide, phosphorus oxychloride, phosphorus trichloride, tribromide, or triiodide. Inert solvents are used in this reaction e.g. benzene, toluene, methylene chloride, chloroform, carbon tetrachloride and the like. With thionyl chloride, reaction temperatures of 50°–80° C. are employed, whereas with the phosphorus halides in chlorinated hydrocarbons temperatures of 0 to 25° C. are preferred. The iodide of formula VIII can also be made by an exchange reaction such as treating a chloride of formula (VIII) with sodium iodide in acetone for 2 to 8 hours at 25°–55° C. When the reaction is terminated, the products of formula VIII are isolated and purified in a conventional manner e.g. chromatography, extraction, recrystallization, and the like.

Compound (VIII) is cyclized to a 1-substituted-6-phenyl-4H-s-triazolo[4,3-a][1,4]benzodiazepine (IX) by treating compound (VIII) with a non-aqueous solution of ammonia. In the preferred embodiment of this invention tetrahydrofuran, methanol, ethanol, methylene chloride, ehter and the like can be used as solvents; anhydrous ammonia without a solvent at its boiling temperature (−33° C.) can also be used. In the preferred embodiment of the invention tetrahydrofuran as solvent is used at a temperature between 0°–30° C. during 18–72 hours. The product is isolated and purified, at the termination of the reaction, by conventional procedures e.g. extraction, chromatography, recrystallization and the like to provide Compound IX.

The following examples are illustrative of the processes and products of the present invention, but are not to be construed as limiting.

EXAMPLE 1

2-amino-5-chlorobenzophenone hydrazone

A mixture of 27.2 g. (0.117 mol) of 2-amino-5-chlorobenzophenone in 170 ml. of diethylene glycol and 23 ml. (0.45 mol.) of 99% hydrazine hydrate was refluxed a total of 7 hours. The solution was allowed to cool overnight to room temperature. The light green-colored solid which resulted was mixed with 400 ml. of water and extracted into benzene; the layers were separated and the benzene portion dried over anhydrous magnesium sulfate and concentrated. Crystallization of the residue from ether/hexane afforded 13.5 g. (46.8%) of white fluffy needles of 2-amino-5-chlorobenzophenone hydrazone of melting point 133°–133.5° C.

Anal. calcd. for $C_{13}H_{12}ClN_3$:
  C, 63.55; H, 4.93; N, 17.11; Cl, 14.43.
Found: C, 63.58; H, 4.95; N, 17.32; Cl, 14.39.

A second crop (6.0 g., 21%) of needles had a melting point of 132–134° C.

EXAMPLE 2

2-amino-2',5-dichlorobenzophenone hydrazone

In the manner given in Example 1, 2-amino-2',5-dichlorobenzophenone was refluxed with hydrazine hydrate in diethylene glycol to give 2-amino-2',5-dichlorobenzophenone hydrazone.

EXAMPLE 3

2-amino-5-chloro-2',6'-difluorobenzophenone hydrazone

In the manner given in Example 1, 2-amino-5-chloro-2',6'-difluorobenzophenone was refluxed with hydrazine hydrate in diethylene glycol to give 2-amino-5-chloro-2',6'-difluorobenzophenone hydrazone.

EXAMPLE 4

2-amino-2'-chloro-5-nitrobenzophenone hydrazone

In the manner given in Example 1, 2-amino-2'-chloro-5-nitro-benzophenone was refluxed with hydrazine hydrate in diethylene glycol to give 2-amino-2'-chloro-5-nitrobenzophenone hydrazone.

EXAMPLE 5

2-aminobenzophenone hydrazone

In the manner given in Example 1, 2-aminobenzophenone was refluxed with hydrazine hydrate in diethylene glycol to give 2-aminobenzophenone hydrazone

EXAMPLE 6

2-benzyl-4-chloroaniline

Potassium hydroxide pellets (16.1 g. 245 mmol.) were ground and dissolved in 85 ml. of refluxing diethylene glycol. Volatile materials were distilled until the temperature of the liquid reached 200° C. The solution was then cooled to room temperature and 13.5 g. (54.6 mmol.) of 2-amino-5-chlorobenzophenone hydrazone was added while the syrupy liquid was gently reheated. At 100° C. all the hydrazone had dissolved. The temperature was maintained between 120°–150° for 45 minutes until gas evolution ceased. After a total heating period of 1.5 hour, the solution was cooled, poured onto ice and extracted with benzene. The benzene layer was separated, dried over anhydrous magnesium sulfate and concentrated to yield an orange oil. Distillation afforded 9.9 g. of 2-benzyl-4-chloroaniline (89.2%) yellow oil of boiling point 125°–140° (at 0.1 mm Hg).

Anal. calcd. for $C_{13}H_{12}ClN$:
  C, 71.72; H, 5.56; N, 6.44; Cl, 16.28.
Found: C, 71.55; H, 5.51; N, 6.58; Cl, 16.16.

EXAMPLE 7

4-chloro-α-(o-chlorophenyl)-o-toluidine

A mixture of 187.5 g. (0.702 mole) of 2-amino-2',5-dichlorobenzophenone in 1020 ml. of diethylene glycol and 138 ml. (2.76 mol.) of 99% hydrazine hydrate was refluxed for 41 hours, that is, until thin layer chromatography (Silica Gel G, eluted with 40% ether/hexane) indicated the absence of starting material. The reaction mixture was cooled carefully to about 60° C. and 241.5 g. (4.30 mol.) of ground potassium hydroxide (85%) was added. The reaction temperature rose to 100° C. The reaction mixture was heated to 140°–150° C. until gas evolution ceased. In this way, heating was maintained for 6 hours. The reaction mixture was worked up by cooling, pouring into 3.0 l. of ice-cold 5% aqueous sodium hydroxide and extracting with benzene. The combined benzene extracts were washed with a saturated aqueous sodium chloride solution and allowed to stand for 2 days. A by-product precipitated and was removed by filtration; the solid was washed with additional benzene. The benzene washings and the benzene layers were combined and dried over anhydrous magnesium sulfate, filtered, and concentrated to yield a red oil, which was distilled at 0.15 mm Hg and 140°–148° C to yield 140.0 g. (71%) of yellow liquid. The oil was crystallized to yield 4-chloro-α-(o-chlorophenyl)-o-toluidine as tan plates of melting point 64.3°–65.0° C.

Anal. calcd. for $C_{13}H_{11}Cl_2N$:
  C, 61.92; H, 4.40; N, 5.56; Cl, 28.12.
Found: C, 62.00; H, 4.46; N, 5.61; Cl, 28.22.

EXAMPLE 8

4-chloro-α-(2,6-difluorophenyl)-o-toluidine

In the manner given in Example 6, 2-amino-5-chloro-2',6'-difluorobenzophenone hydrazone was warmed with potassium hydroxide in diethylene glycol at 120°–150° C. to give 4-chloro-α-(2,6-difluorophenyl)-o-toluidene.

EXAMPLE 9

2-(o-Chlorobenzyl)-4-nitroaniline

In the manner given in Example 6, 2-amino-2'-chloro-5-nitrobenzophenone hydrazone was warmed with potassium hydroxide in diethylene glycol at 120°–150° C. to give 2-(o-chlorobenzyl)-4-nitroaniline.

EXAMPLE 10

2-benzylaniline

In the manner given in Example 6, 2-aminobenzophenone hydrazone was warmed with potassium hydroxide in diethylene glycol at 120°–150° C. to give 2-benzylaniline, melting point 51°–53°.

EXAMPLE 11

1-acetyl-2-[N-(4-chloro-α-phenyl-o-tolyl)formimidoyl]hydrazine

A mixture of 3.37 g. (15.5 mmol) of 2-benzyl-4-chloroaniline, 5.52 g. (37.3 mmol.) of triethylorthoformate and a catalytic amount of the starting amine hydrochloride was refluxed 5 hours to distill off ethanol. The orange solution was permitted to cool to room temperature. This crude oil was then dissolved in 25 ml. of absolute ethanol and 2.35 g. (32.0 mmol.) of acethydrazide was added. After stirring the solution for 0.5 hours, a white solid precipitated. Stirring was continued for an additional 2.5 hours and then the solid was dissolved in ethyl acetate and recrystallized from ethyl acetate/hexane to give 2.95 g. (61%) of white fine needles of 1-acetyl-2-[N-(4-chloro-α-phenyl-o-tolyl)formimidoyl]hydrazine of melting point 170.5°–173° C. The analytical sample had a melting point of 174°–175° C.

Anal. calcd. for $C_{16}H_{16}ClN_3O$:
C, 63.68; H, 5.35; N, 13.93; Cl, 11.74.
Found: C, 63.81; H, 5.22; N, 13.94; Cl, 11.57.

A second crop (0.8 g. 17%) had a melting point 157°–160° C.

EXAMPLE 12

1-isonicotinoyl-2-[N-(4-chloro-α-phenyl-o-tolyl)formimidoyl]hydrazine

A mixture of 10.12 g. (46.5 mmol.) of 2-benzyl-4-chloroaniline and 16.57 g. (101.9 mmol.) of triethylorthoformate was refluxed in a 50 ml. round bottom flask to distill ethanol. After an additional 2–4 hour heating period, the liquid in the flask was permitted to cool to room temperature and the resulting reaction mixture dissolved in 100 ml. of absolute ethanol. To this solution was added 13.2 g. (96 mmol.) of isoniazid. The mixture (isoniazid is not soluble in cold ethanol) was stirred at room temperature overnight. The solid was 't ed and dissolved in 700 ml. of tetrahydrofuran (THF) and concentrated to a volume of 350 ml. Hexane was cautiously added until the solution just became cloudy. A white solid (5.3 g. 31%) was collected, melting point 173°–178° C. Recrystallization of a small sample from tetrahydrofuran increased the melting point to 180°–182° C. A sample crystallized from dimethylformamide water had a melting point of 193°–194° C.

The mother liquors from the first crystallization yielded 3.67 g. (22%) of white powder melting point 178°–182° C. The analytical sample had a melting point 180°–182° C.

EXAMPLE 13

2-acetyl-2-[N-[4-chloro-α-(o-chlorophenyl)-o-tolyl]formimidoyl]hydrazine.

A mixture of 37.8 g. (0.150 mol.) of 4chloro-α-(o-chlorophenyl)-o-tolidine and 57.0 g. of triethylorthoformate (0.385 mol.) was refluxed for 3.5 hours to distill ethanol. The oil was cooled to room temperature (22°–25° C.) and dissolved in 450 ml. of cold absolute ethanol. Acethydrazide (23.7 g.; 0.320 mol.) was added and the mixture stirred overnight. Within 1 hour after all the acethydrazide dissolved, a yellow precipitate formed. After the reaction was complete, the precipitate was filtered and washed with about 400 ml. of absolute ethanol and 100 ml. of hexane to give 46.83 g. (92.6%) of 1-acetyl-2-[N-[4-chloro-α-(o-chlorophenyl)-o-tolyl]formimidoyl]hydrazine as a white solid melting point 196.5°–199.5° C. An analytical sample had a melting point of 213°–214° C.

Anal. calcd. for $C_{16}H_{15}Cl_2N_3O$:
C, 57.15; H, 4.50; N, 12.50; Cl, 21.09.
Found: C, 57.06; H, 4.41; N, 12.26; Cl, 21.31.

EXAMPLE 14

1-propionyl-2-[N-[N-chloro-α-(2,6-difluoro-phenyl)-o-toly]formimidoyl]hydrazine

In the manner given in Example 11, 4-chloro-α-(2,6-difluorophenyl-o-toluidine and triethylorthoformate was refluxed, then after 5 hours, treated at room temperature with propionic acid hydroazide to give 1-propionyl-2-[N-[4-chloro-α-(2,6-difluorophenyl)-o-toly]formimidoyl]hydrazine.

EXAMPLE 15

1-cyclopropylcarbonyl-2-[N-[α-(o-chlorophenyl)-4-nitro-o-tolyl]formimidoyl]hydrazine In the manner given in Example 11, 2-(o-chlorobenzyl)-4-nitroaniline and triethylorthoformate was refluxed, then, after 5 hours, treated, at room temperature with cyclopropylcarbonyl hydrazide to give 1-cyclopropylcarbonyl-2-[N-[α-(o-chlorophenyl)-4-nitro-o-tolyl]formimidoyl]hydrazine.

EXAMPLE 16

1-benzoyl-2-[N-(α-phenyl-o-tolyl)formimidoyl]-hydrazine

In the manner given in Example 11, 2-benzylaniline and triethyl orthoformate was refluxed, then after 5 hours, treated, at room temperature, with benzoylhydrazide to give 1-benzoyl-2-[N-(α-phenyl-o-tolyl)formimidoyl]hydrazine.

EXAMPLE 17

1-(Pyridine-2-carbonyl)-2-[N-(4-chloro-α-phenyl-o-tolyl)formimidoyl]hydrazine

In the manner given in Example 11, 2-benzyl-4-chloroaniline and triethylorthoformate was refluxed, then, after 5 hours treated, at room temperature, with pyridine-2-carboxylic acid hydrazide to give 1-(pyridine-2-carbonyl)-2-[N-(4-chloro-α-phenyl-o-tolyl)formimidoyl]hydrazine.

EXAMPLE 18

4-[4-chloro-α-(phenyl)-o-tolyl]-3-methyl-4H-1,2,4-triazole

To a one liter flask was added 28.4 g. (094.2 mmole) of 1-acetyl-2-[N-[4-chloro-α-(phenyl)-o-tolyl]formimidoyl]-hydrazone and 400 ml. of diglyme. The mixture was heated to reflux and at 120° all the solid starting material dissolved. Pyridine (20 ml.) was added and the solution was refluxed overnight (20 hours). About 200 ml. of pyridine, water, and diglyme were removed by distillation under reduced pressure and to the remaining cold reaction solution was added 1,500 ml. of (reagent grade) hexane. Trituration in an ice bath yielded 20.8 g. (78%) of 4-[4-chloro-α-(phenyl)-o-tolyl]-3-methyl-4H-1,2,4,-triazole of melting point 135°–139° C. An analytical sample was obtained on recrystallization from ethyl acetate/hexane melting point 142° C.

Anal. calcd. for $C_{16}H_{14}ClN_3$:
C, 67.72; H, 4.97; N, 14.81; Cl, 12.50.
Found: C, 67.99; H, 4.98; N, 14.99; Cl, 12.61.

EXAMPLE 19

4-[4-chloro-α-(phenyl)-o-tolyl]-3-(4-pyridyl)-4H-1,2,4-triazole 1-isonicotinoyl-2-[N-(4-chloro-α-phenyl-o-tolyl)formimidoyl]hydrazine (3.64 g., 10.0 mmol.) was placed in a 200 ml. round bottom flask with 60 ml. of diglyme. The mixture was refluxed. At a pot temperature of approximately 150° C., all the starting material was dissolved. Refluxing was continued an additional 3 hours and the solution was permitted to cool overnight. The slightly cloudy liquid was dried with anhydrous magnesium sulfate-sodium sulfate and filtered. Hexane was added (900 ml.) and the solution was placed in a refrigerator after scratching to induce crystallization. The light brown solid was filtered to yield 2.33 g. (67%) of 4-[4-chloro-α-(phenyl)-o-tolyl]-3-(4-pyridyl)-4H-1,2,4-triazole with a melting point of 138°–142° C. An analytical sample was prepared most conveniently by recrystallization first from aqueous methanol to give plates having a melting point 145°–146° C. followed by recrystallization from ethyl acetate/hexane to yield white prisms of melting point 145.5°–146.5° C.

Anal. calcd. for $C_{20}H_{15}ClN_4$:
C, 69.26; H, 4.36; N, 16.16; Cl, 10.22.
Found: C, 69.32; H, 4.64; N, 16.15; Cl, 10.28.

EXAMPLE 20

4-[4-chloro-α-(o-chlorophenyl)-o-tolyl]-3-methyl-4H-1,2,4-triazole 1-acetyl-2-[N-[4-chloro-α-(o-chlorophenyl)-o-tolyl]-formimidoyl]hydrazine (33.62 g., 0.100 mol.) was heated in 400 ml. of diglyme for 28 hours so that the starting material was no longer present. The diglyme, pyridine and water were removed in vacuo to give a brown solid residue which began to crystallize on standing. Recrystallization from ethyl acetate gave 4-[4-chloro-α-(o-chlorophenyl)-o-tolyl]-3-methyl-4H-1,2,4-triazole in two crops 17.3 g. (55%) and 3.9 g. (11.5%). The melting point was 159.5°–161° C.

Anal. calcd. for $C_{16}H_{13}Cl_2N_3O$:
C, 60.39; H, 4.12; N, 13.21; Cl, 22.28.
Found: C, 60.13; H, 4.02; N, 13.34; Cl, 22.52.

EXAMPLE 21

4-[4-chloro-α-phenyl-o-tolyl]-3-(2-pyridyl)-4H-1,2,4-triazole

In the manner given in Example 18, 1-(pyridine-2-carbonyl)-2-[N-[4-chloro-α-phenyl-o-tolyl]formimidoyl]hydrazine was heated with diglyme and pyridine to give 4-[4-chloro-α-phenyl-o-tolyl]-3-(2-pyridyl)-4H-1,2,4-triazole.

EXAMPLE 22

4-[4-chloro-α-(2,6-difluorophenyl)-o-tolyl]-3-ethyl-4H-1,2,4-triazole

In the manner given in Example 18, 1-propionyl-2-[N-[4-chloro-α-(2,6-difluorophenyl)-o-tolyl]formimidoyl]hydrazine was heated with diglyme and pyridine to give 4-[4-chloro-α-(2,6-difluorophenyl)-o-tolyl]-3-ethyl-4H-1,2,4-triazole.

EXAMPLE 23

4-[α-(o-chlorophenyl)-4-nitro-o-tolyl]-3-cyclopropyl-4H-1,2,4-triazole

In the manner given in Example 18, 1-cyclopropylcarbonyl-2-[N-[α-(o-chlorophenyl)-4-nitro-o-tolyl]formimidoyl]-hydrazine was heated with diglyme and pyridine to give 4-[α-(o-chlorophenyl)-4-nitro-o-tolyl]-3-cyclopropyl-4H-1,2,4-triazole.

EXAMPLE 24

4-[α-(phenyl)-o-tolyl]-3-phenyl-4H-1,2,4-triazole

In the manner given in Example 18, 1-benzoyl-2-[N-(α-phenyl-o-tolyl)formimidoyl]hydrazine was heated with diglyme and pyridine to give 4-[α-(phenyl)-o-tolyl]-3-phenyl-4H-1,2,4-triazole.

In the manner given in the prior examples other triazolo compounds of formula V can be made such as:

4-[α-(o-chlorophenyl)-4-chloro-o-tolyl]-3-(4-pyridyl)-4H-1,2,4-triazole;

4-[α-(m-bromophenyl)-5-bromo-o-tolyl]-3-methyl-4H-1,2,4-triazole;

4-[α-phenyl-4-chloro-o-tolyl]-3-(3-pyridyl)-4H-1,2,4-triazole;

4-[α-(o-chlorophenyl)-4-chloro-o-tolyl]-4H-1,2,4-triazole;

4-[α-(m-nitrophenyl)-4-chloro-o-tolyl]-4H-1,2,4-triazole;

4-[α-(o-fluorophenyl)-5-ethyl-o-tolyl]-3-(cyclopentyl)-4H-1,2,4-triazole;

4-[α-(o-bromophenyl)-3-fluoro-o-tolyl]-3-(cyclobutyl)-4H-1,2,4-triazole;

4-[α-(2,4-difluorophenyl)-5-isopropyl-o-tolyl]-3-(3-pyridyl-4H-1,2,4-triazole;

4-[α-(3,5-dimethoxyphenyl-3,5-difluoro-o-tolyl]-3-(isopropyl)-4H-1,2,4-triazole;

and the like.

EXAMPLE 25

5-chloro-2-(3-methyl-4H-1,2,4-triazol-4-yl)benzophenone

Jones' Reagent (0.5 ml.), was added to a solution of 4-[4-chloro-α-(phenyl)-o-tolyl]-3-methyl-4H-1,2,4-triazole (0.285 g., 1.00 mmol.) in 1 ml. of glacial acetic acid. The solution was stirred for 2 hours at room temperature and 4 hours at reflux (steam bath). An additional 0.5 ml. of Jones' Reagent was added and the solution was refluxed for 1 more hour. The reaction mixture was pured into 50 ml. of 5% aqueous sodium hydroxide and extracted with chloroform. The chloroform extract was dried over anhydrous magnesium sulfate and concentrated on a rotary evaporator (Rota Vap) to leave a yellow solid. Crystallization from ethyl acetate/hexane afforded 180 mg. (61%) of 5-chloro-2-(3-methyl-4H-1,2,4-triazol-4-yl)benzophenone as white prisms of melting point 164°–166° C. Recrystallization changed the melting point to 167.5°–169° C. identical to that of an authentic sample.

EXAMPLE 26

2',5-dichloro-2-(3-methyl-4H-1,2,4-triazol-4-yl)benzophenone

In a 10 ml. flask, 315 mg. (0.99 mmol.) of 4-[4-chloro-α-(o-chlorophenyl)-o-tolyl]-3-methyl-4H-1,2,4-triazole was dissolved in 1.0 ml. of acetic acid and 1.0 ml. of Jones' reagent. The mixture was refluxed for 2 hours and worked up by quenching in 40 ml. of 7% aqueous sodium hydroxide and extracting with chloroform. The organic layer was dried and crystallized from ethyl acetate:hexane (1:2) to give 170 mg. of 2',5-dichloro-2-(3-methyl-4H-1,2,4-triazol-4-yl)benzophenone as prisms of melting point 147.5°–148.5° C.

Anal. calcd. for $C_{16}H_{11}ClN_2O$:
C, 57.85; H, 3.34; N, 12.65; Cl, 21.35.
Found: C, 57.70; H, 3.21; N, 12.47; Cl, 21.58.

EXAMPLE 27

5-chloro-2',6'-difluoro-2-(3-ethyl-4H-1,2,4-triazol-4-yl)benzophenone

In the manner given in Example 25, 4-[4-chloro-α-(2,6-difluorophenyl)-o-tolyl]-3-ethyl-4H-1,2,4-triazole was oxidized with Jones' reagent to give 5-chloro-2',6'-difluoro-2-(3-ethyl-4H-1,2,4-triazol-4-yl)benzophenone.

EXAMPLE 28

2'-chloro-5-nitro-2-(3-cyclopropyl-4H-1,2,4-triazol-4-yl)benzophenone

In the manner given in Example 25, 4-[α-(o-chlorophenyl)-4-nitro-o-tolyl]-3-cyclopropyl-4H-1,2,4-triazole was oxidized with Jones' reagent to give 2'-chloro-5-nitro-2-(3-cyclopropyl-4H-1,2,4-triazol-4-yl)benzophenone.

EXAMPLE 29

2-(3-phenyl-4H-1,2,4-triazol-4-yl)benzophenone

In the manner given in Example 25, 4-[α-(phenyl)-o-tolyl]-3-phenyl-4H-1,2,4-triazole was oxidized with Jones' reagent to give 2-(3-phenyl-4H-1,2,4-triazol-4-yl)benzophenone.

EXAMPLE 30

5-chloro-2-[3-(2-pyridyl)-4H-1,2,4-triazol-4-yl]benzophenone

In the manner given in Example 25, 4-[4-chloro-α-phenyl-o-tolyl]-3-(2-pyridyl)-4H-1,2,4-triazole was oxidized with Jones' reagent to give 5-chloro-2-[3-(2-pyridyl)-4H-1,2,4-triazol-4-yl]benzophenone.

EXAMPLE 31

5-chloro-2-[3-(4-pyridyl)-4H-1,2,4-triazol-4-yl]benzophenone

Jones' reagent (1.5 ml.) was added to a solution of 4-[4-chloro-α-(phenyl)-o-tolyl]-3-(4-pyridyl)-4H-1,2,4-triazole (0.696 g., 2.00 mmol.) in 2 ml. of glacial acetic acid. The mixture was refluxed gently on a steam bath. After 1.5 hours of reflux, the solution had become dark green in color. A small portion was removed and quenched in 5% sodium hydroxide and extracted with chloroform, dried over anhydrous magnesium sulfate, and concentrated and analyzed by thin layer chromatography. An additional 1.5 ml. of Jones' reagent was added and the refluxing continued for another 3.5 hours. The reaction was permitted to cool to room temperature overnight and worked up as described above to give 400 m.g. of slightly brown solid. Recrystallization from chloroform-hexane afforded 380 mg. of 5-chloro-2-[3-(4-pyridyl)-4H-1,2,4-triazol-4-yl]benzophenone as fine white needless of melting point 250°–251° C. The analytical sample (recrystallized from chlorofrom/methanol) had a melting point 251°–251.5° C.

Anal. calcd. for $C_{20}H_{13}ClN_4O$:
C, 66.58; H, 3.63; N, 15.53; Cl, 9.83.
Found: C, 66.45; H, 3.65; N, 15.36; Cl, 9.88.

In the manner given in the preceding examples other 2-(3-substituted-4H-1,2,4-triazol-4-yl)benzophenones compounds can be produced from the corresponding 2-amino-benzophenones. Representative compounds, thus obtained include:

3',5-dibromo-2-(3-propyl-4H-1,2,4-triazol-4-yl)benzophenone;
2'-bromo-6-fluoro-2-(3-cyclobutyl-4H-1,2,4-triazol-4-yl)-benzophenone;
2'-fluoro-4-ethyl-2-(3-cyclopentyl-4H-1,2,4-triazol-4-yl)-benzophenone;
4',-diisopropyl-2-(3-cyclohexyl-4H-1,2,4-triazol-4-yl)-benzophenone;
3'-nitro-3-ethyl-2-[3-(3-pyridyl)-4H-1,2,4-triazol-4-yl]-benzophenone;
4-bromo-5-chloro-2-(3-cyclooctyl-4H-1,2,4-triazol-4-yl)-benzophenone;
4'-nitro-4-fluoro-2-[3-(2-pyridyl)-4H-1,2,4-triazol-4-yl]-benzophenone;
2',4'-difluoro-4-isopropyl-2-[3-(3-pyridyl)-4H-1,2,4-triazol-4-yl]benzophenone;
3',5'-dimethoxy-4,6-difluoro-2-(3-isopropyl-4H-1,2,4-triazol-4-yl)benzophenone;
2',6',4,5-tetraethyl-2-[3-cyclopropyl-4H-1,2,4-triazol-4-yl]benzophenone;
2',5-dichloro-2-[3-(4-pyridyl)-4H-1,2,4-triazol-4-yl]benzophenone;
and the like.

The benzophenones VI described in Examples 25 to 31 can be converted to the corresponding triazolobenzodiazepines IX as shown in the following reactions:

EXAMPLE 32

5-Chloro-2-[3-(hydroxymethyl)-5-methyl-4H-1,2,4-triazol-4-yl]benzophenone

A stirred mixture of 5-chloro-2-[3-methyl-4H-1,2,4-triazol-4-yl]benzophenone, (2.98 g., 0.01 mole) paraformaldehyde (3 g.) and xylene (100 ml.) was warmed under nitrogen, in a bath maintained at 125° C. for 7 hours. The mixture was then concentrated in vacuo. The residue was chromatographed on silica gel (150 g.) with 3% methanol–97% chloroform. Fifty-ml. fractions were collected. The product was eluted in fractions 20–44 The fractions were concentrated and the residue was crystallized from ethanol-ethyl acetaate to give: 1.64 g. of melting point 138°–142° C.; 0.316 g. of melting point 138.5°–141° C.; 0.431 g. of melting point 139°–141° C. (72.8% yield) of 5-chloro-2-[3-(hydroxymethyl)-5-methyl-4H-1,2,4-triazol-4-yl]benzophenone. The analytical sample had a melting point of 138°–139° C.

Anal. calcd. for $C_{17}H_{14}ClN_3O_2$:
C, 62.30; H, 4.30; Cl, 10.81; N, 12.82.
Found: C, 62.23; H, 4.22; Cl, 10.82; N, 12.67.

EXAMPLE 33

5-Chloro-2-[3-(bromomethyl)-5-methyl-4H-1,2,4-triazol-4-yl]benzophenone

A solution of 5-chloro-2-[3-hydroxymethyl)-5-methyl-4H-1,2,4-triazol-4-yl]benzophenone (328 mg., 0.001 mole) in dry, hydrocarbon-stabilized chlorofrom (5 ml.) was cooled in an ice bath and treated with phosphorus tribromide (0.1 ml.). The colorless solution was kept in the ice bath for 55 minutes, at ambient temperature (22°–24° C.), for 5 hours. The resulting yellow solution was poured into a mixture of ice and dilute sodium bicarbonate. This mixture was extracted with chloroform. The extract was washed with brine, dried over anhydrous magnesium sulfate and concentrated. The residue was crystallized from methylene chloride-ethyl acetate to give; 0.285 g. of melting point 200°–240° (decomposition) and 0.030 g. of melting point 200°–220° C. (decomposition) of 5-chloro-2-[3-(bromomethyl)-5-methyl-4H-1,2,4-triazol-4-yl]benzophenone. The analytical sample had a melting point of 200°–240° C.

Anal. calcd. for $C_{17}H_{13}BrClN_3O$:
C, 52.26; H, 3.35; Br, 20.46; Cl, 9.08; N, 10.76.
Found: C, 52.13; 52.45; H, 3.77, 3.66; Br, 20.44; Cl, 9.20; N, 10.43

EXAMPLE 34

8-chloro-1-methyl-6-phenyl-4H-s-triazolo-[4,3-a][1,4]benzodiazepine

A stirred suspension of 5-chloro-2-[3-(bromomethyl)-5-methyl-4H-1,2,4-triazol-4-yl]benzophenone (391 mg., 0.001 mole) in tetrahydrofuran (15 ml.) was cooled in an ice bath and treated with a saturated solution of ammonia in methanol (12.5 ml.). The resulting solution was allowed to warm to ambient temperature and stand for 24 hours. It was then concentrated in vacuo. The residue was suspended in water, treated with sodium bicarbonate and extracted with methylene chloride. The extract was washed with brine, dried and anhydrous potassium carbonate and concentrated. The residue was crystallized from methylene chloride-ethyl acetate to give 0.220 g. of crude product of melting point 227°–228.5° C. Recrystallization of this material from ethyl acetate gave 0.142 g. of melting point 228°–229.5°, 0.053 g. of melting point 228.5°–229.5° C. and 0.021 g. of melting point 228°–229.5° C. of 8-chloro-1-methyl-6-phenyl4H-s-triazol[4,3-a][1,4]benzodiazepine. Other triazolobenzodiazepines are obtained in the same manner shown above from benzophenones of formula VI.

We claim:
1. A process for the production of 2-(3-substituted-4H-1,2,4-triazol-4-yl)benzophenones of the formula VI:

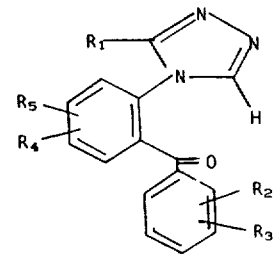

wherein $R_1$ is selected from the group consisting of hydrogen, alkyl of 1 to 3 carbon atoms, inclusive, cycloalyl of 3–8 carbon atoms, inclusive, phenyl, and 2-, 3-, and 4-pyridyl and wherein $R_2$, $R_3$, $R_4$, and $R_5$ are selected from the group consisting of hydrogen, halogen, nitro, alkyl, and alkoxy, in which the carbon chain moieties are of 1 to 3 carbon atoms, inclusive, which comprises the following steps:

1. reacting a 2-aminobenzophenone of formula I

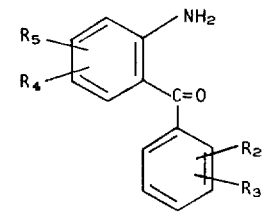

wherein $R_2$, $R_3$, $R_4$, and $R_5$ are defined as above, with hydrazine hydrate to obtain the corresponding hydrazone II:

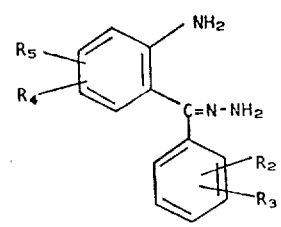

wherein $R_2$, $R_3$, $R_4$, and $R_5$ are defined above;

2. treating compound II with a strong base at 100°–150° C. to obtain the corresponding 2-benzylaniline of formula III:

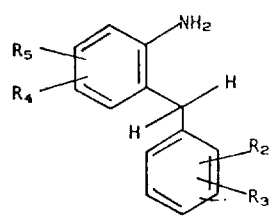

wherein $R_2$, $R_3$, $R_4$, and $R_5$ are defined as above;

3. heating compound III with triethylorthoformate or trimethylorthoformate, followed by treating with an acid hydrazide of the formula
$NH_2-NH-CO-R_1$ wherein $R_1$ is defined as above, at room temperature to obtain the corresponding 1-acyl or aroyl-2-[N-(α-phenyl-o-tolyl)formimidoyl]hydrazine (IV) of the formula:

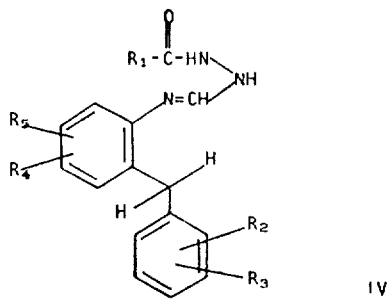

wherein $R_1$, $R_2$, $R_3$, $R_4$, and $R_5$ are defined as above;

4. cyclizing IV by heating it in diglyme to obtain the corresponding 4-[α-(phenyl)-o-tolyl]-3-substituted-4H-1,2,4-triazole V:

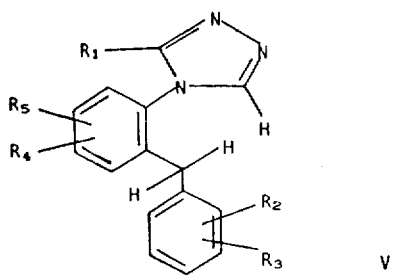

wherein $R_1$, $R_2$, $R_3$, $R_4$, and $R_5$ are defined as above;

5. oxidizing V with Jones' reagent to obtain the corresponding 2-(3-substituted-4H-1,2,4-triazol-4-yl)benzophenone VI of above.

2. The process of claim 1, wherein the hydrazone formation of step 1 is carried out in diethylene glycol.

3. The process of claim 1, wherein the hydrazone of step 1 is treated in step 2 with potassium hydroxide in diethylene glycol at temperatures from 100° to 150° C.

4. The process of claim 1, wherein the formimidoyl hydroazine of step 3 is produced with acethydrazide.

5. The process of claim 1, wherein the formimidoyl hydrazine of step 3 is produced with pyridine-4-carboxylic acid hydrazide.

6. The process of claim 1, wherein the starting product of formula I is 2-amino-5-dichlorobenzophenone and the acid hydrazide is acethydrazide.

7. The process of claim 1 wherein in step IV the diglyme is used in the presence of pyridine.

8. The process of claim 1 wherein the starting product of formula I is 2-amino-2',5'-dichlorobenzophenone and the acid hydrazide is acethydrazide.

9. The process of claim 1 wherein $R_1$ is hydrogen or alkyl of 1 to 3 carbon atoms, inclusive, and wherein $R_2$, $R_3$, $R_4$, and $R_5$ are selected from the group of hydrogen, chlorine, and fluorine.

* * * * *